(12) United States Patent
Watanabe et al.

(10) Patent No.: US 7,519,820 B2
(45) Date of Patent: Apr. 14, 2009

(54) IMAGE FORMING SYSTEM AND IMAGE FORMING METHOD

(75) Inventors: Ryoji Watanabe, Kanagawa (JP); Akihiko Takada, Kanagawa (JP); Masayoshi Sakakibara, Kanagawa (JP); Hajime Kishimoto, Kanagawa (JP); Yasuo Horino, Tokyo (JP); Toshiyuki Yano, Kangawa (JP); Yasuhiro Matsuo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 630 days.

(21) Appl. No.: 10/647,528

(22) Filed: Aug. 26, 2003

(65) Prior Publication Data
US 2004/0111647 A1 Jun. 10, 2004

(30) Foreign Application Priority Data
Aug. 28, 2002 (JP) ............................. 2002-248791

(51) Int. Cl.
*H04L 9/32* (2006.01)
(52) U.S. Cl. ...................................... 713/176; 380/232
(58) Field of Classification Search ...................... 713/1, 713/2, 188, 194, 176, 193; 380/200, 201, 380/255, 277, 232; 726/2
See application file for complete search history.

(56) References Cited

U.S. PATENT DOCUMENTS

| | | | | | |
|---|---|---|---|---|---|
| 4,672,683 | A * | 6/1987 | Matsueda | .................... | 382/305 |
| 6,005,605 | A * | 12/1999 | Kostreski et al. | .............. | 348/21 |
| 6,005,936 | A * | 12/1999 | Shimizu et al. | ............. | 713/176 |
| 6,128,411 | A * | 10/2000 | Knox | ........................ | 382/232 |
| 6,212,337 | B1 * | 4/2001 | Petruchik et al. | ............ | 396/311 |
| 6,240,196 | B1 * | 5/2001 | Fischer et al. | ............... | 382/100 |
| 6,411,784 | B1 * | 6/2002 | Taniguchi | ....................... | 399/6 |
| 6,525,836 | B1 * | 2/2003 | Ito et al. | ..................... | 358/1.18 |
| 6,643,330 | B1 * | 11/2003 | Nakagawa et al. | ..... | 375/240.28 |
| 6,674,537 | B2 * | 1/2004 | Kadowaki | ................... | 358/1.15 |
| 6,683,699 | B1 * | 1/2004 | Ashizaki et al. | ............ | 358/1.18 |
| 6,754,640 | B2 * | 6/2004 | Bozeman | ..................... | 705/40 |
| 6,859,794 | B2 * | 2/2005 | Takaragi | ...................... | 705/67 |
| 6,931,541 | B1 * | 8/2005 | Nakagawa | .................. | 713/193 |
| 6,990,588 | B1 * | 1/2006 | Yasukura | .................... | 713/186 |
| 2002/0015161 | A1 * | 2/2002 | Haneda et al. | ............... | 358/1.2 |
| 2002/0025083 | A1 * | 2/2002 | Asano | ........................ | 382/298 |
| 2002/0134842 | A1 * | 9/2002 | Brunet | ....................... | 235/487 |
| 2002/0169666 | A1 * | 11/2002 | Ike et al. | ...................... | 705/14 |
| 2002/0169714 | A1 * | 11/2002 | Ike et al. | ...................... | 705/39 |
| 2002/0196452 | A1 * | 12/2002 | Komiya | ...................... | 358/1.1 |

(Continued)

FOREIGN PATENT DOCUMENTS

JP     A 2000-285203     10/2000

(Continued)

*Primary Examiner*—Kimyen Vu
*Assistant Examiner*—Joseph Pan
(74) *Attorney, Agent, or Firm*—Oliff & Berridge, PLC

(57) ABSTRACT

An image having no secrecy is printed on a non-secret information display area of an original paper, whereas an image having secrecy, which should be originally printed, is not printed on a secret image display area. When the original paper is copied on a printing paper, an image read from the original paper is printed on a secret image display area, whereas a secret image is printed on a non-secret information display area only when an access operation to the secret image is authenticated.

10 Claims, 12 Drawing Sheets

U.S. PATENT DOCUMENTS

| | | | |
|---|---|---|---|
| 2003/0016744 A1* | 1/2003 | Nakagawa | 375/240.01 |
| 2003/0046691 A1* | 3/2003 | Nakagawa | 725/38 |
| 2004/0017925 A1* | 1/2004 | Marvel et al. | 382/100 |
| 2004/0042640 A1* | 3/2004 | Ikeda et al. | 382/115 |

FOREIGN PATENT DOCUMENTS

| | | | |
|---|---|---|---|
| JP | A-2001-024845 | 1/2001 | |
| JP | A 2001-134672 | 5/2001 | |
| JP | A 2001-148000 | 5/2001 | |
| JP | A 2001-229199 | 8/2001 | |
| JP | A 2001-260580 | 9/2001 | |
| JP | A 2001-283011 | 10/2001 | |
| JP | A-2002-175210 | 6/2002 | |
| JP | A-2002-190911 | 7/2002 | |

* cited by examiner

IMAGE FORMING SYSTEM AND IMAGE FORMING METHOD

The present disclosure relates to the subject matter contained in Japanese Patent Application No.2002-248791 filed on Aug. 28, 2002, which is incorporated herein by reference in its entirety.

BACKGROUND OF THE INVENTION

1. Field of the Invention

The present invention is related to an image forming system and an image forming method, which can protect secret information using a non-contact memory attached to an original paper.

2. Description of the Related Art

A compact semiconductor chip (for example, µ-chip by HITACHI, LTD.) from which an external unit can read stored data in a non-contact manner has been known.

Also, JP-A-2001-229199, JP-A-2000-285203, JP-A-2001-134672, JP-A-2001-283011, JP-A-2001-148000, and JP-A-2001-260580 disclose applications of the compact semiconductor chip.

SUMMARY OF THE INVENTION

The present invention has been made from the viewpoint of the technical background, and therefore, has an object to provide an image forming system and an image forming method, by which secret information can be protected and copying operation can be restricted while utilizing a semiconductor chip from which data stored therein can be read in a non-contact manner.

[Image Forming System]

To achieve the above-described object, according to a first aspect of the invention, an image forming system includes an image display member on which a first image is displayed, and an image forming apparatus. The image display member includes a data supply apparatus, which stores therein data of a second image and authentication data used for an access authentication to the data of the second image and supplies the stored data of the second image and the stored authentication data to an external. The image forming apparatus includes an image reading section for reading the displayed first image; a data reading section for reading the supplied data of the second image and the supplied authentication data; an authentication section for receiving access to the data of the second image and determining whether or not allowing the access to the data of the second image, on the basis of the read authentication data; and an image forming section for forming the first image and the second image when the access to the data of the second image is authenticated, and for forming the first image in the other cases.

Preferably, the data supply apparatus has an encrypting section for encrypting the data of the second image and the authentication data, which are supplied to the external. The image forming apparatus further includes a decrypting section for decrypting the read authentication data.

Preferably, the data of the second image and the authentication data, which are supplied to the external, have been encrypted. The image forming apparatus further includes a decrypting section for decrypting the read authentication data.

Preferably, the data reading section reads the data of the second image when the access to the data of the second image is authenticated.

Preferably, when the access to the data of the second image is not authenticated, the image forming section forms the first image, second image, and an image indicating that the access to the data of the second image is not authenticated.

Preferably, the image display member is an original on which the first image is formed. The data supply apparatus is attached to the original. The data supply apparatus is a non-contact memory, wherein the data of the second image and the authentication data, which are stored in the non-contact memory, are readable from the external in a non-contact manner. The data reading section of the image forming apparatus reads the supplied data of the second image and the supplied authentication data from the non-contact memory in the non-contact manner.

Preferably, the authentication data is a password. The data reading section reads the supplied data of the second image and the supplied password. When an input password for the access to the data of the second image is coincident with the read password, the authentication section allows to access the data of the second image.

Preferably, the data of the second image indicates an image, which should be formed in combination with the data of the first image. When the image forming section forms the second image, the image forming section forms the second image in combination with the first image.

[Explanation of Image Procesing System]

Next, a description will now be made of an image forming system according to the present invention with reference to an example.

It should be understood that the present invention is not limited to the below-mentioned example.

In the image forming system, only an image (first image) having no secrecy is visibly displayed on an original paper (image display member) whose image is an object to be read. Anyone can observe the image (first image).

An image (second image) is stored into a semiconductor chip (data providing apparatus) in combination with a password in such a manner that this second image cannot be visibly recognized by merely viewing the original paper. The second image should be originally displayed in combination with the first image, but is desired to be presented only to a specific person since this second image owns secrecy. This password is employed in order to authenticate an access operation with respect to the second image. From the semiconductor chip, the data stored thereinto can be read in a non-contact manner by using electromagnetic waves. This semiconductor chip into which these data have been stored is attached to the original paper by way of an embedding manner, or the like.

An image forming apparatus corresponds to, for instance, such a copying machine in which the first image is read from the original paper by a scanner (image reading means) and then this read first image is printed out (image forming operation).

A data reading section reads the second image and the password from the semiconductor chip by using electromagnetic waves via an antenna, which is arranged in the vicinity of the original paper.

An authenticating section receives a password, which is input by a user by manipulating a keyboard, a touch panel, or the like, which is equipped in the copying machine. Then, this authenticating section compares this accepted password with the password read by the data reading section.

Only when these passwords are made coincident with each other, the authenticating section authenticates that the user who inputs the received password accesses the second image.

Only when the authenticating section authenticates the access operation to the second image, an image forming section synthesizes the first image read from the original paper with the second image read from the semiconductor chip, and then prints this synthesized image on a printing paper in such a manner that this printed image is visibly recognized by any persons.

When the authenticating section does not authenticate the access operation to the second image, the image forming section prints only first image which has been read from the original paper on the printing paper in a similar manner to the normal copying operation.

[Image Display Member]

Also, according to a second aspect of the invention, an image display member includes a first image displayed on a surface of the image display member, and a data supply apparatus for storing data of a second image and authentication data used for access authentication to the data of the second image and supplying the stored data of the second image and the stored authentication data to an external.

Preferably, the data supply apparatus includes an encrypting section for encrypting the data of the second image and the authentication data before supplying the data of the second image and the authentication data to the external.

[Image Forming Apparatus]

Also, according to a third aspect of the invention, an image forming apparatus includes an image reading section for reading a first image of a image display member; a data reading section for reading data of a second image and authentication data from the image display member; an authentication section for receiving access to the data of the second image and determining whether or not allowing the access to the data of the second image on the basis of the read authentication data; and an image forming section for forming the first image and the second image when the access to the data of the second image is authenticated, and for forming the first image in other cases.

Preferably, the image forming apparatus further includes a decrypting section for decrypting the read authentication data.

[Image Forming Method]

Also, according to a fourth aspect of the invention, an image forming method includes supplying data of a second image and authentication data; reading a first image; reading the supplied data of the second image and the supplied authentication data; receiving access to the data of the second image; determining whether or not authenticating the access to the data of the second image on the basis of the read authentication data; and forming the first image and the second image when the access to the data of the second image is authenticated, and forming the first image in the other cases.

[Program]

Further, according to a fifth aspect of the invention, a program makes a computer perform a process including reading a first image; reading data of a second image and authentication data; receiving access to the data of the second image; determining whether or not authenticating the access to the data of the second image on the basis of the read authentication data; and forming the first image and the second image when the access to the data of the second image is authenticated, and forming the first image in the other cases.

DETAILED DESCRIPTION OF THE PREFERRED EMBODIMENTS

Now, a description will be described on embodiments of the present invention.

[Copying Apparatus 1]

Figure 1:
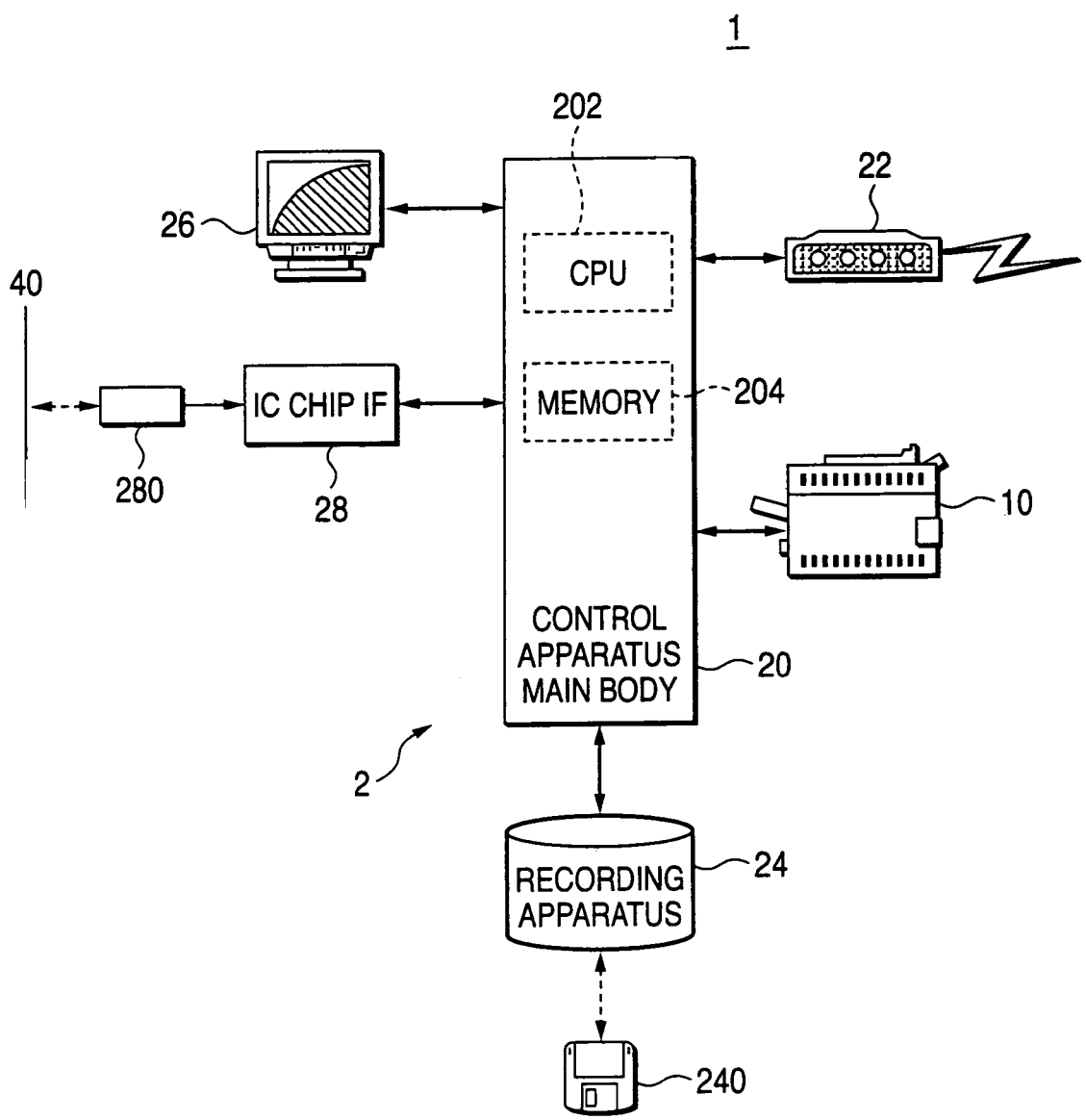
FIG. 1 is a diagram for indicating a hardware structure of a copying apparatus to which an image forming method of the present invention is applied, i.e., for mainly exemplifying a control apparatus thereof.

FIG. 1 is a diagram for showing a hardware structure of a copying apparatus 1 to which an image forming method according to the present invention is applied, while a control apparatus 2 of this copying apparatus 1 is mainly illustrated.

As represented in FIG. 1, the copying apparatus 1 includes the control apparatus 2 and a copying apparatus main body 10.

The control apparatus 2 includes a control apparatus main body 20, a communication apparatus 22, a recording apparatus 24 such as an HDD/CD apparatus, a user interface apparatus (UI apparatus) 26, and an IC chip interface (IC chip IF) 28. The control apparatus main body 20 contains a CPU 202, a-memory 204, and the like. The user interface apparatus 26 contains either an LCD display apparatus or a CRT display apparatus, and a keyboard/touch panel, and so on. The IC chip interface 28 contains an antenna 280.

[Copying Apparatus Main Body 10]

Figure 2:
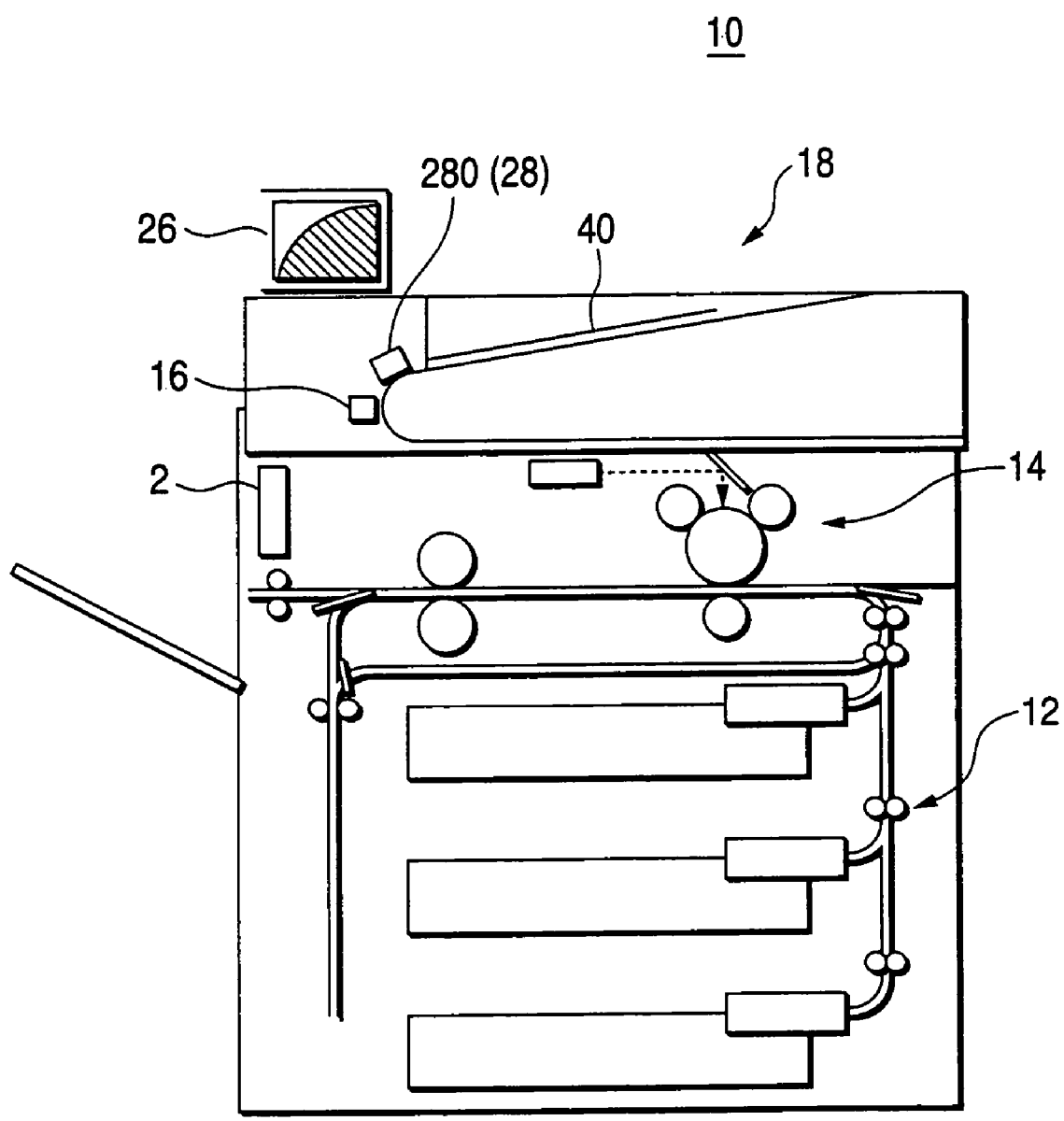
FIG. 2 is a diagram for exemplifying a hardware construction of a copying apparatus main body indicated

FIG. 2 is a diagram for showing a hardware structure of the copying apparatus main body 10 indicated in FIG. 1 in an exemplification manner.

As indicated in FIG. 2, the copying apparatus main body 10 includes a paper tray unit 12, a print engine 14, a scanner 16, an original feeding apparatus 18, and the like. The print engine 14 prints images on printing papers 42 (see FIG. 3B) by way of the xerography technique and the like. The scanner 16 reads images of an original paper 40. The original feeding apparatus 18 feeds the original paper 40.

Also, in the copying apparatus main body 10, the IC chip IF 28 and the antenna 280 are arranged in the vicinity of an original feeding path of the original feeding apparatus 18, through which the original paper 40 is transported. Also, the UI apparatus 26 is arranged at an upper portion of the copying apparatus main body 10.

In other words, the copying apparatus 1 employs a hardware structure in which the IC chip IF 28 and the antenna 280 are added to a general-purpose copying apparatus, which reads the image of the original paper transported from the original feeding apparatus 18 to print the image.

It should be noted that as represented in FIG. 2, the control apparatus 2 (see FIG. 1) is actually stored inside the apparatus main body 10.

[Original Paper 40/Printing Paper 42]

Figure 3A:
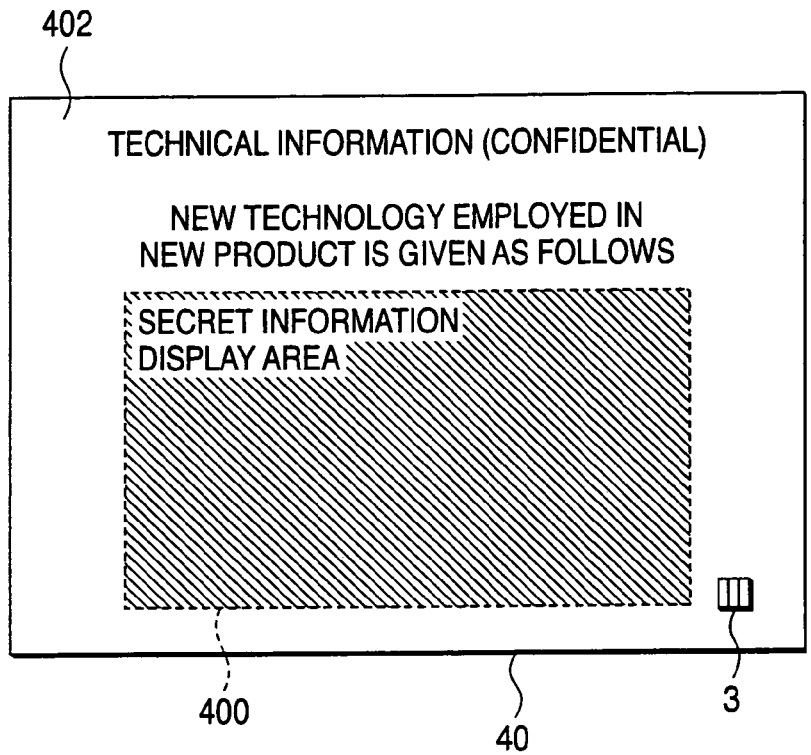
FIG. 3A is a diagram for exemplifying original papers shown in FIG. 1 and FIG. 2.
Figure 3B:
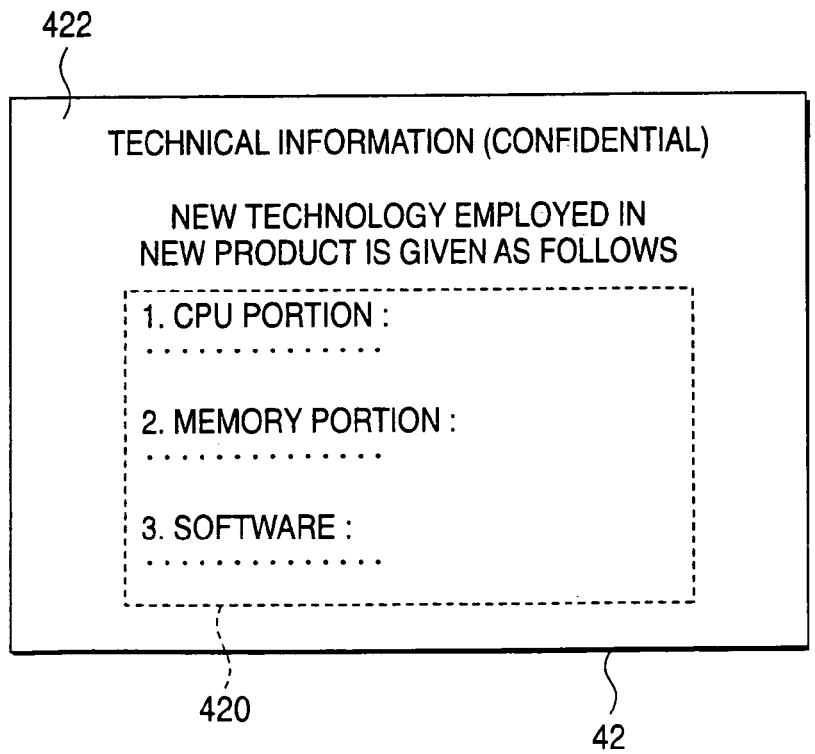
FIG. 3B is a diagram for exemplifying an image which is obtained by copying the original paper shown in FIG. 3A on a printing paper.

FIG. 3A is a diagram for showing the original paper 40 shown in FIG. 1 and FIG. 2. FIG. 3B is a diagram for showing an image, which is obtained by that the copying apparatus 1 copies the original paper 40 indicated in FIG. 3A on a printing paper 42.

As indicated in FIG. 3A, a first IC chip 3 is added to this original paper 40 by way of an embedding method, or the like.

Both a non-secret information display area 402 and a secret image display area 400 are provided on a surface of the original paper 40.

As shown in FIG. 3A, an image having no secrecy is printed on the non-secret information display area 402, which the image can be visibly recognized by any persons. This image having no secrecy corresponds to, for example, "technical information (confidential), new technology employed in product is given as follows:" as shown in FIG. 3A and FIG. 3B.

It should be noted that such an image having secrecy (confidential image) is not visibly printed on the secret image display area 400. This image having the secrecy corresponds to, for instance, "1. CPU portion: . . . , 2. memory portion: . . . , 3. software: . . . ," as shown in FIG. 3B.

As shown in FIG. 3B, a non-secret information display area 422 and a secret image display area 420 are also provided on a surface of the printing paper 40.

When the original paper 40 is copied on the printing paper 42, as indicated in FIG. 3B, the image having no secrecy, which has been read from the original paper 40, is visibly printed on the non-secret information display area 422, which can be recognized by any persons.

On the other hand, only when an access operation with respect to the image having secrecy is authenticated, the image having secrecy shown in FIG. 3B is printed on the secret image display area 420.

Figure 4:
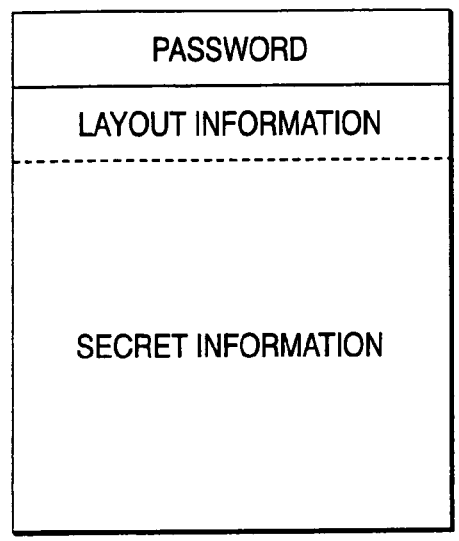
FIG. 4 is a diagram for exemplifying information which is stored into a first IC chip attached to the original paper shown in FIG. 3A.

FIG. 4 is a diagram for showing information, which is stored in the first IC chip 3 attached to the original paper 40 shown in FIG. 3A.

As shown in FIG. 4, information having secrecy (namely, secret information, or confidential information) and a password, which is employed to authenticate an access to this secret information, are stored in the first IC chip 3. Further, layout information is stored in this first IC chip 3, if necessary. This layout information indicates that the secret information is printed on either these areas 422 or 420 of the printing paper 42.

For instance, secret information, which will be stored in the IC chip 3, indicates an image, which should be originally printed on the non-secret information display area 402 of the original paper 40 in combination with an image of the non-secret information display area 402.

In other words, the secret information indicates an image, which is shown in the secret information display area 420 of the printing paper 42 of FIG. 3B.

[IC Chip 3/IC Chip IF 28]

Figure 5:
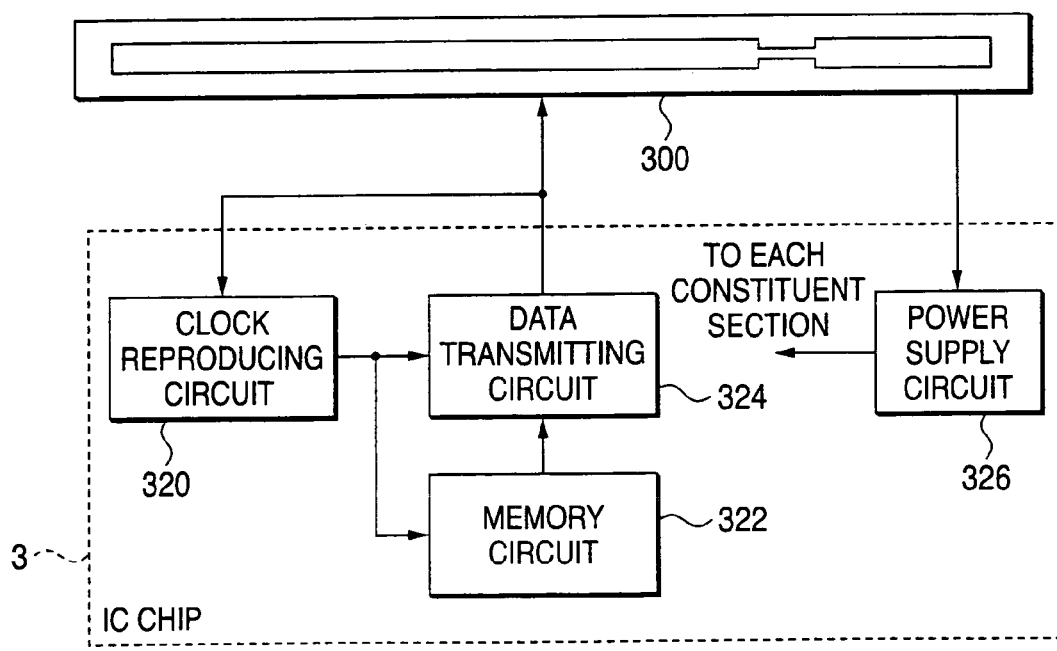
FIG. 5 is a diagram for showing a structure of the first IC chip indicated in FIG. 3A.

FIG. 5 is a diagram for schematically showing a structure of the first IC chip 3 shown in FIG. 3A.

Figure 6:
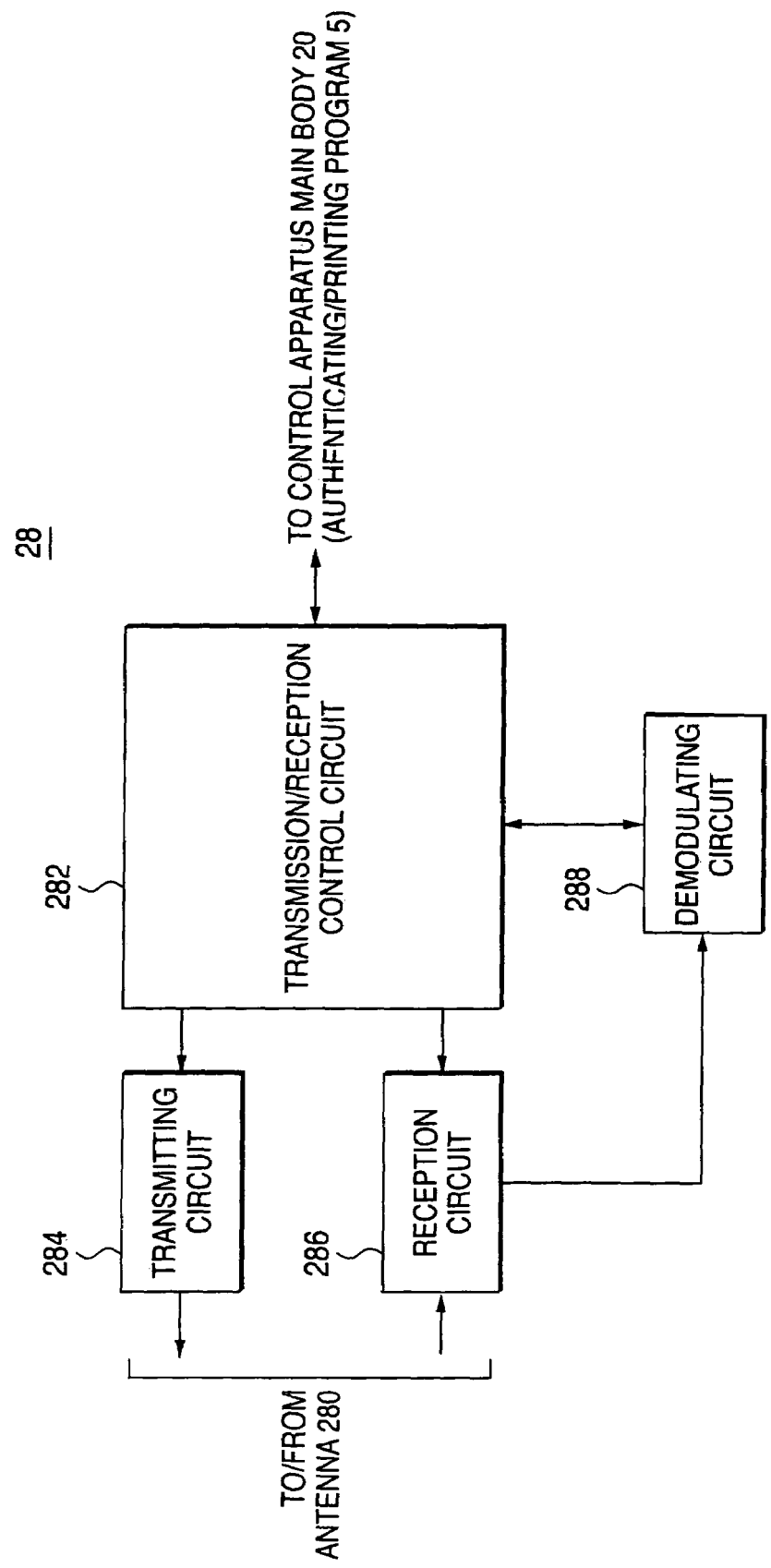
FIG. 6 is a diagram for indicating a structure of an IC chip IF shown in FIG. 1 and FIG. 2.

FIG. 6 is a diagram for schematically showing a structure of the IC chip IF 28 shown in FIGS. 1 and 2.

As shown in FIG. 5, the IC chip 3 includes an antenna 300, a clock reproducing circuit 320, a memory circuit 322, a data transmitting circuit 324, and a power supply circuit 326.

It should also be noted that when it is so guaranteed that the IC chip 3 of the original paper 40 passes through an area in close proximity to the antenna 280, an IC chip 3 having no antenna 300 may be employed.

Also, as shown in FIG. 6, the IC chip IF 28 includes a transmitting circuit 284, a reception circuit 286, a transmission/reception control circuit 282, and a demodulating circuit 288.

In accordance with the below-mentioned operations of the respective constituent components employed in the IC chip 3 and the IC chip IF 28, information (data), which has been stored in the IC chip 3, may be read therefrom via the IC chip IF 28 in a non-contact manner.

In the IC chip 3 (see FIG. 5), the power supply circuit 326 rectifies an electromagnetic wave signal supplied via the antenna 300 so as to supply electric power to the respective constituent components of the IC chip 3, while this electric power is required for these constituent components.

The clock reproducing circuit 320 reproduces a clock signal from the electromagnetic wave signal supplied from the antenna 300 via the IC chip IF 28 to output the reproduced clock signal to the memory circuit 322 and the data transmitting circuit 324.

The memory circuit 322 outputs a data indicative of information (FIG. 4) stored therein to the data 15, transmitting circuit 324 in synchronization with the clock signal.

The data transmitting circuit 324 changes a reflection intensity of the electromagnetic wave signal supplied from the IC chip IF 28 in accordance with a data value input from the memory circuit 322 in synchronization with the clock signal input from the clock reproducing circuit 320.

As previously explained, the data indicative of the information, which has been stored in the memory circuit 322, may be transmitted from the IC chip 3 to the IC chip IF 28 by changing the intensity of the reflection signal of the electromagnetic wave signal transmitted from the IC chip IF 28 to the IC chip 3.

In the IC chip IF 28 (FIG. 6), the transmission/reception control circuit 282 controls operations of the respective constituent components of the IC chip IF 28.

Also, this transmission/reception control circuit 282 outputs to the control apparatus main body 20 (namely, first authenticating/printing program 5, which will be discussed Later with reference to FIG. 7, secret information (FIG. 4), which has been received by the reception circuit 286 and then has been demodulated by the demodulating circuit 288.

The transmission circuit 284 transmits the electromagnetic wave signal via the antenna 280 to the IC chip 3, while this electromagnetic wave signal contains the clock signal.

The reception circuit 286 receives a reflection signal, which is reflected from the IC chip 3, to output the received reflection signal to the demodulating circuit 288.

The demodulating circuit 288 demodulates the data transmitted from the IC chip 3 based upon change of the reflection signal input from the reception circuit 286, to output the demodulated data to the transmission/reception control circuit 282.

[First Authenticaing/Printing Program 5]

Figure 7:
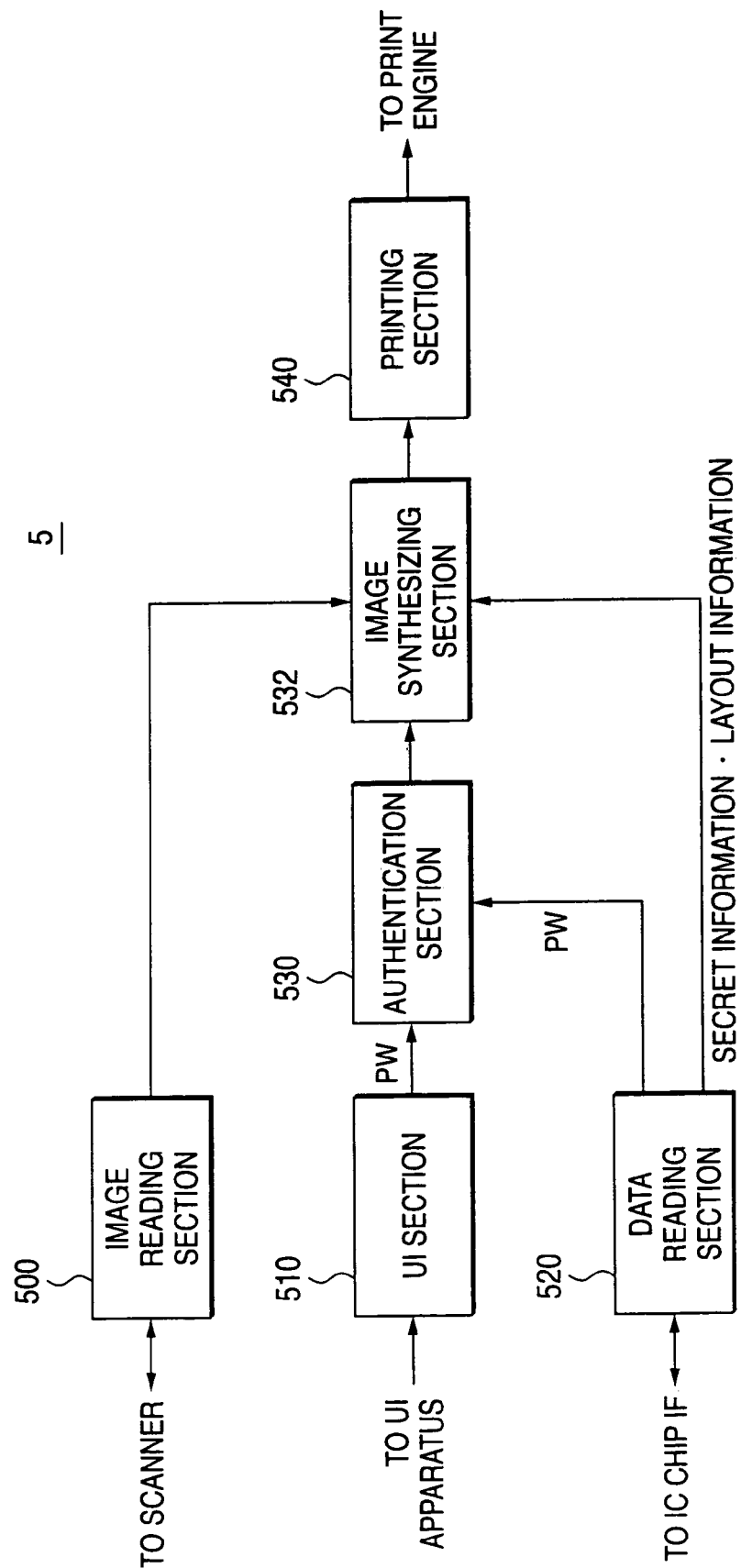
FIG. 7 is a diagram for showing a structure of a first authenticating/printing program which is executed by the control apparatus 2 (FIG. 1 and FIG. 2) so as to realize the image forming method according to the present invention.

FIG. 7 is a block diagram for schematically showing a structure of a first authenticating/printing program 5, which is executed by the control apparatus 2 (see FIG. 1 and FIG. 2) to realize the image forming method according to the embodiment of the invention.

As shown in FIG. 7, the first authenticating/printing program 5 includes an image reading section 500, a UI section 510, a data reading section 520, an authentication section 530, an image synthesizing section 532, and a printing section 540.

The first authenticating/printing program 5 is supplied via, for example, a recording medium 240 (see FIG. 1) to the control apparatus 2, and is loaded to the memory 204 so as to be executed.

In the first authenticating/printing program 5, the image reading section 500 controls the constituent components of the copying apparatus main body 10 such as the scanner 16 (FIG. 2) to read an image of the original paper 40 (FIG. 3).

The UI section 510 receives operation by a user with respect to the UI apparatus 26 (FIGS. 1 and 2), and outputs data indicative of a password (PW) to the authentication section 530.

It should be understood that the following case is explained as a specific example in the below-mentioned description. That is, when a user of the copying apparatus 1 inputs a password to the UI apparatus 26 so as to perform a copy starting operation, the first authenticating/printing program 5 executes an authentication operation using the password.

The data reading section 520 controls the IC chip IF 28 to read a data, which indicates a password and the secret information (FIG. 4) from the IC chip 3, and then, outputs a data indicative of the secret information and the layout information to the image synthesizing section 532, and outputs a data indicating the password to the authentication section 530.

The authentication section 530 compares the data indicative of the password, which is input by the user via the UI section 510 with the password, which is read via the data reading section 520 from the IC chip 3. When these passwords are made coincident with each other, the authentication section 530 allows the user to access the secret information. To the contrary, when these passwords are not made coincident with each other, the authentication section 530 doesn't allow (deny) the user to access the secret information.

When the authentication section 530 allows the user to access the secret information, the image synthesizing section 532 synthesizes the image data of the original paper 40 read by the image reading section 500 with the data indicative of the secret information read by the data reading section 520, and then outputs the synthesized data to the printing section 540.

When the authentication section 530 doesn't allow the user to access the secret information, the image synthesizing section 532 outputs only the image data of the original paper 40 read by the image reading section 500 to the printing section 540.

In other words, when the authentication section 530 allows the user to access, the authentication section 530 produces image data indicative of an image as shown in FIG. 3B, and then outputs this produced image data to the printing section 540.

To the contrary, when the authentication section 530 denies the user to access, the authentication section 530 produces an image data, which does not display the image indicated by the secret information, at a portion of the secret image display area 420 of the printing paper 42 shown in FIG. 3B, and then outputs this produced image data to the printing section 540.

The printing section 540 controls the print engine 14 (FIG. 2) so as to print out the image obtained by the image synthesizing section 532 on the printing paper 42 (FIG. 3B).

[Overall Operation]

Next, overall operation of the copying apparatus will be described.

Figure 8:
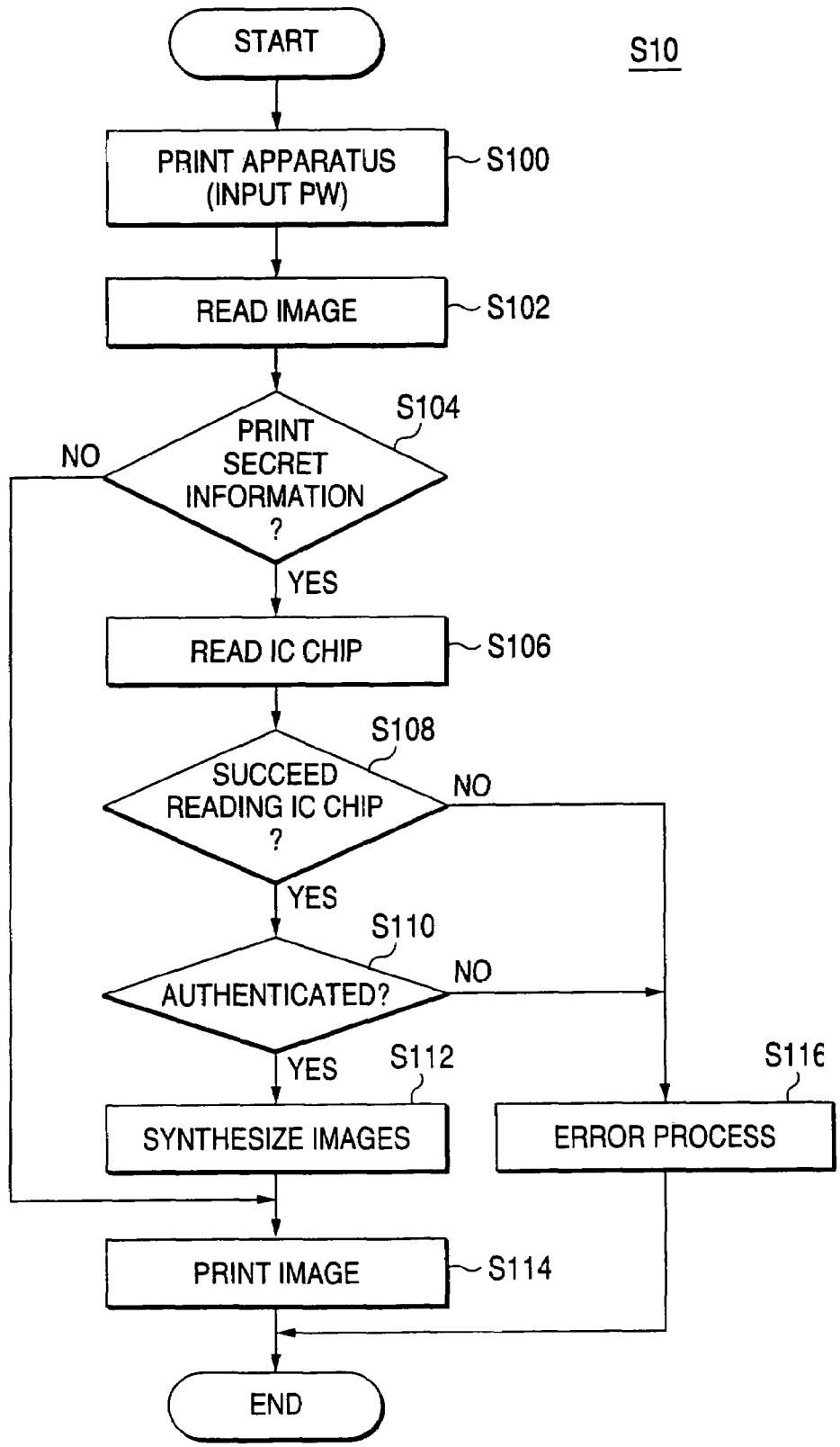
FIG. 8 is a flow chart for indicating a first operation (step S10) of the copying apparatus (first authenticating printing program).

FIG. 8 is a flow chart for describing a first operation (defined in S10) of the copying apparatus 1 (namely, first authenticating/printing program 5).

As shown in FIG. 8, in a step 100 (S100), the user performs an operation for commencing a printing operation with respect to the UI apparatus 26 (FIG. 1 and FIG. 2).

When the UI section 510 (FIG. 7) receives this operation by the user, the UI section 510 outputs the received data to the authentication section 530 and the like.

In a step 102 (S102), when the print starting operation is carried out with respect to the UI apparatus 26, the image reading section 500 controls the scanner 16 and the like so as to read an image of the original paper 40.

For instance, when the user merely executes the print starting operation with respect to the UI apparatus 26, the copying apparatus 1 may perform a simple copying process operation.

To the contrary, when the user executes the print starting operation after the user has executed an operation for inputting a password, the copying apparatus 1 executes the image forming process operation according to the embodiment of the present invention.

In a step 104 (S104), the UI section 510 judges as to whether the user performs the operation for simple copying or the operation for printing an image of the secret information stored in the IC chip 3.

If the user carries out the former operation, the image synthesizing section 532 directly outputs the image, which has been read in the process of the step S102 to the printing section 540. Then, the first authenticating/printing program 5 is advanced to another process defined in a step S114. Otherwise, this first authenticating/printing program 5 is advanced to a process defined in a step S106.

In the step 106 (S106), the data reading section 520 controls the IC chip IF 28 so as to read data from the IC chip 3 of the original paper 40, which is transported by the original feeding apparatus 18.

In a step S108 (S108), the data reading section 520 judges as to whether or not the normal data reading operation from the IC chip 3 can succeed.

When the data reading operation from the IC chip 3 can succeed, the first authenticating/printing program 5 is advanced to a process defined in a step S110, whereas in other cases, this first authenticating/printing program 5 is advanced to a process defined in a step S116.

In the step 110 (S110), the authentication section 530 determined whether or not authenticating an access operation with respect to the secret information.

When the authentication section 530 authenticates the access operation with respect to the secret information, the first authenticating/printing program 5 is advanced to a process defined in a step S112. Otherwise, this first authenticating/printing program 5 is advanced to another process defined in a step S116.

In a step 112 (S112), the image synthesizing section 532 synthesizes the image data entered from the image reading section 500 with the secret information input from the data reading section 520, and then outputs image data, which has been obtained as the synthesizing result, to the printing section 540.

It should be understood that when layout information is input from the data reading section 520, the image synthesizing section 532 synthesizes the image data input from the image reading section 500 with the secret information input from the data reading section 520 in accordance with this layout information.

In a step 114 (S114), the printing section 540 controls the print engine 14 and the like to print the image data input from the image synthesizing section 532.

In the step S116 (S116), the first authenticating/printing program 5 executes an error processing operation.

As an example of this error processing operation, the following process operation may be conceived. That is, while a message is displayed on the UI apparatus 22, in which the UI section 510 could not read data normally, or the authentication section 530 cannot succeed in the authentication, the first authenticating/printing program 5 initializes the process operation.

[Modification]

It should also be noted that information, which is stored as the secret information into the IC chip 3, may be specific image data, and also may be data in other formats such as text data, which is converted into image data in the copying apparatus 1.

Further, data, which is stored into the IC chip 3 and is employed for an authentication purpose, need not necessarily indicate a password, but may be other sorts of data, which is employed in this authentication purpose.

Figure 9:
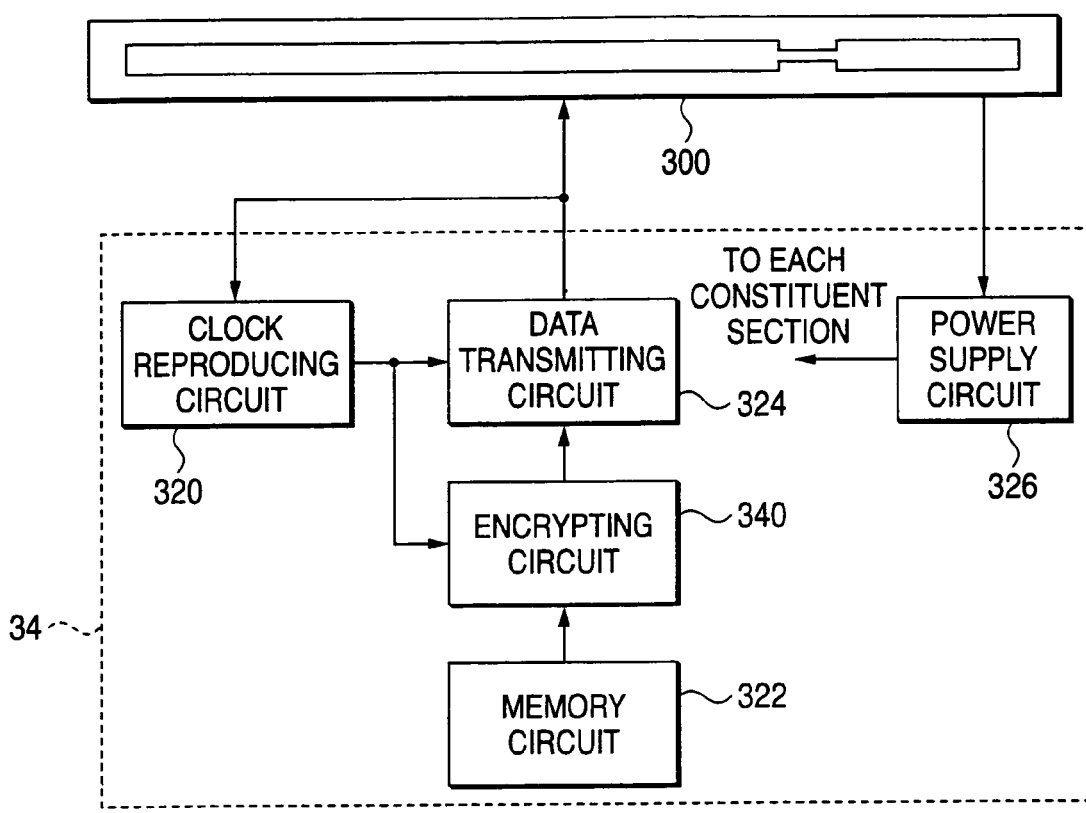
FIG. 9 is a diagram for representing a structure of a second IC chip.

FIG. 9 is a diagram for indicating a structure of a second IC chip 34 according to the embodiment of the present invention.

Figure 10:
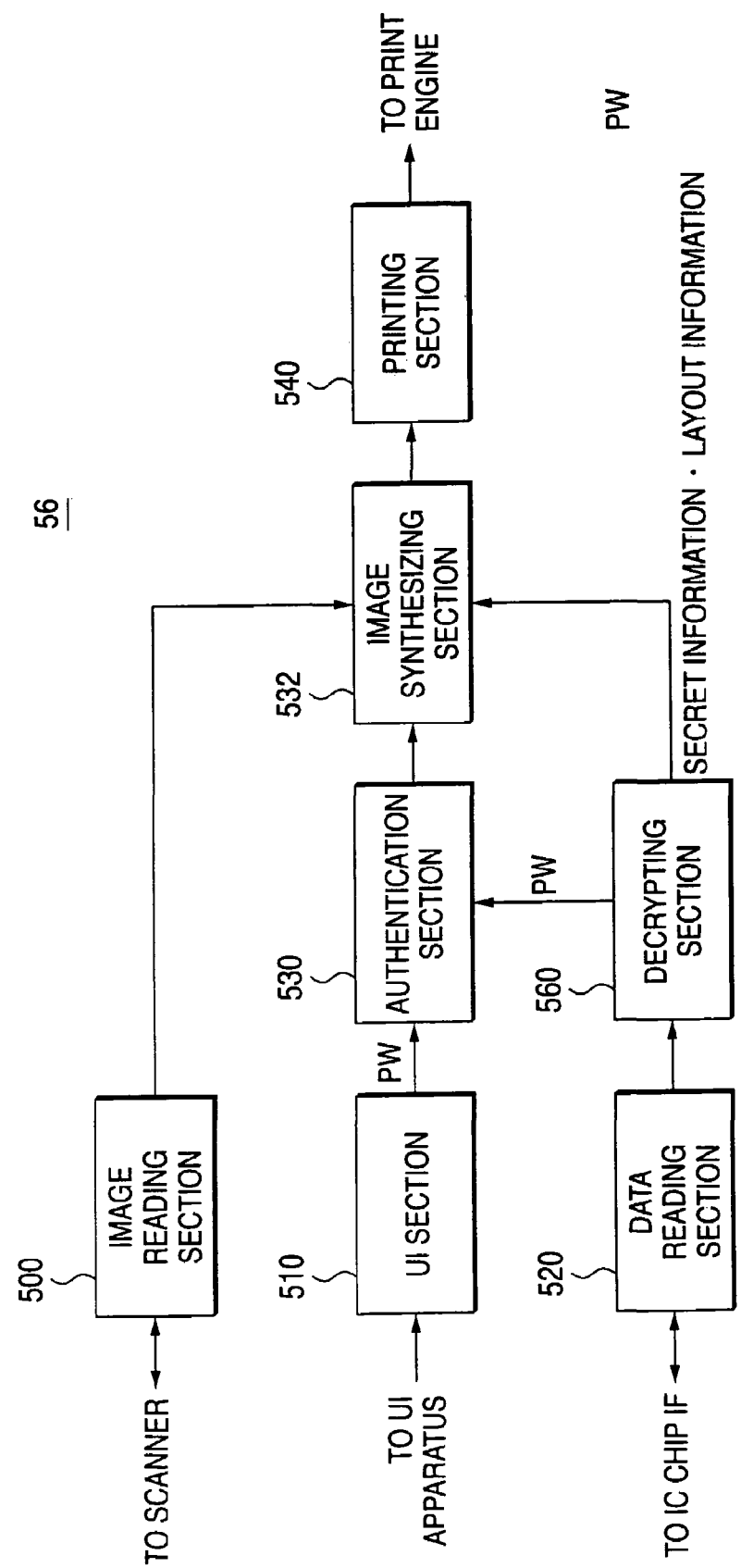
FIG. 10 is a diagram for representing a structure of a second authenticating/printing program.

FIG. 10 is a block diagram for showing a structure of a second authenticating/printing program 56.

As shown in FIG. 9, in the second IC chip 34, an encrypting circuit 340 is additionally interposed between the memory circuit 322 and the data transmitting circuit 324 of the first IC chip 3.

As shown in FIG. 10, in the second authenticating/printing program 56, a decrypting section 560 is additionally interposed among the data reading section 520, the authentication section 530, and the image synthesizing section 532 of the first authenticating/printing program 5.

It should be understood that the same reference numerals used in the respective constituent components of the first IC chip 3 will be employed as those for denoting the essentially same constituent components of the second IC chip 34. Furthermore, the same reference numerals used in the respective constituent components of the first authenticating/printing program 5 will be employed as those for denoting the essentially same constituent components of the second authenticating/printing program 56.

In the second IC chip 34, the encrypting section 340 reads a data indicative of a password, secret information (FIG. 4), and the like from the memory circuit 322 in synchronization with the clock signal, and then encrypts this read data to output the encrypted data to the data transmitting circuit 324.

In the second authenticating/printing program 56, the decrypting section 560 decrypts the data encrypted by the encrypting section 340.

As previously described, it is preferable to execute an operation of encrypting the data in the IC chip 34 and decrypting the encrypted data in the second authenticating/printing program 56 in order to improve secrecy of information, as compared with an operation of not performing the data encryption or the data decryption.

It should also be noted that while the first IC chip 3 (FIG. 5) may be combined with the second authenticating/printing program 56. In this case, encrypted data has been previously stored in the IC chip 3 and this encrypted data is decrypted by the decrypting unit 560.

Figure 11:
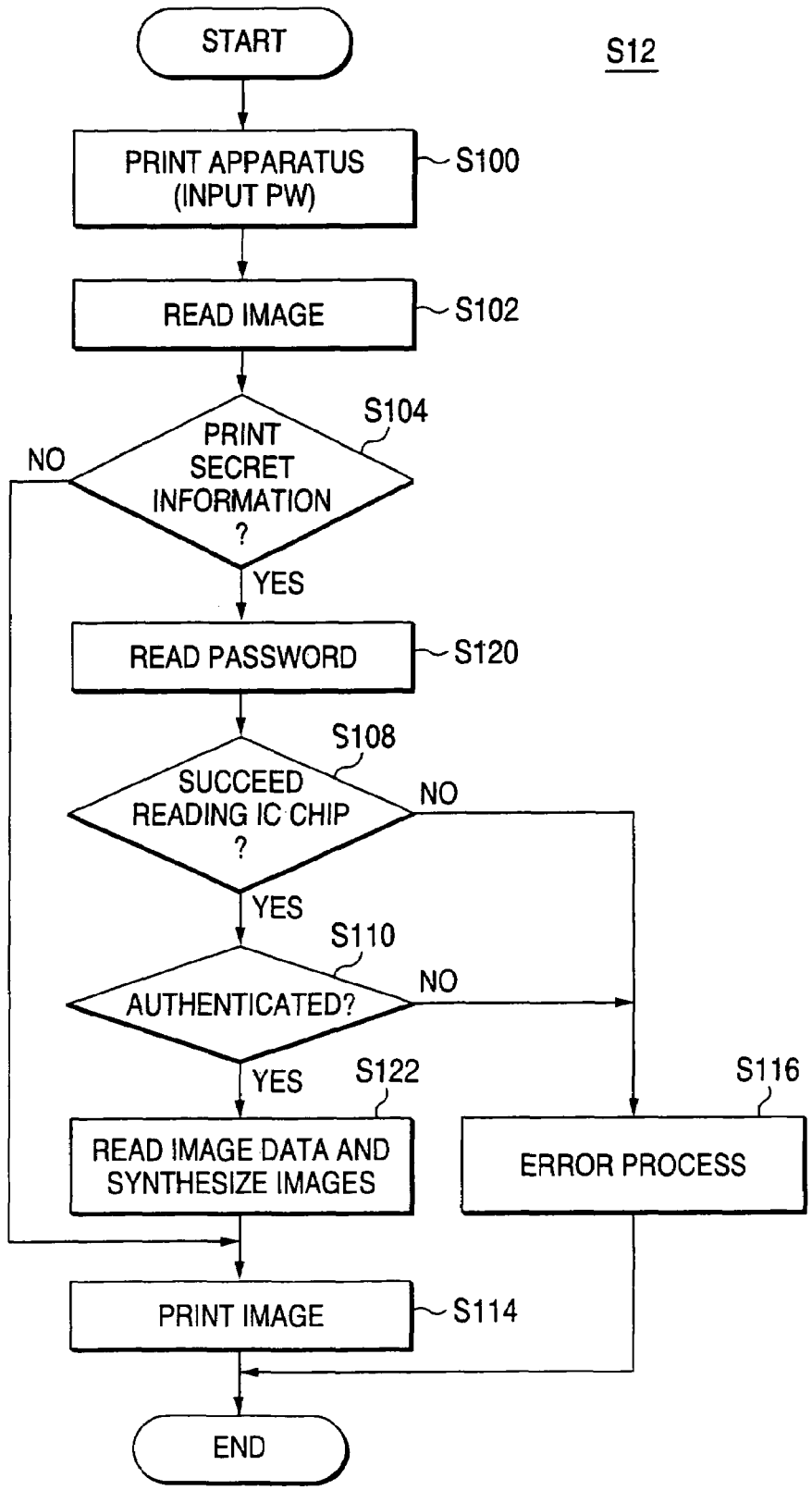
FIG. 11 is a flow chart for indicating a second operation (step S12) of a copying apparatus (first authenticating/printing program).

FIG. 11 is a flow chart for describing a second operation (step S12) of the copying apparatus 1 (first authenticating/printing program 5).

Figure 12:
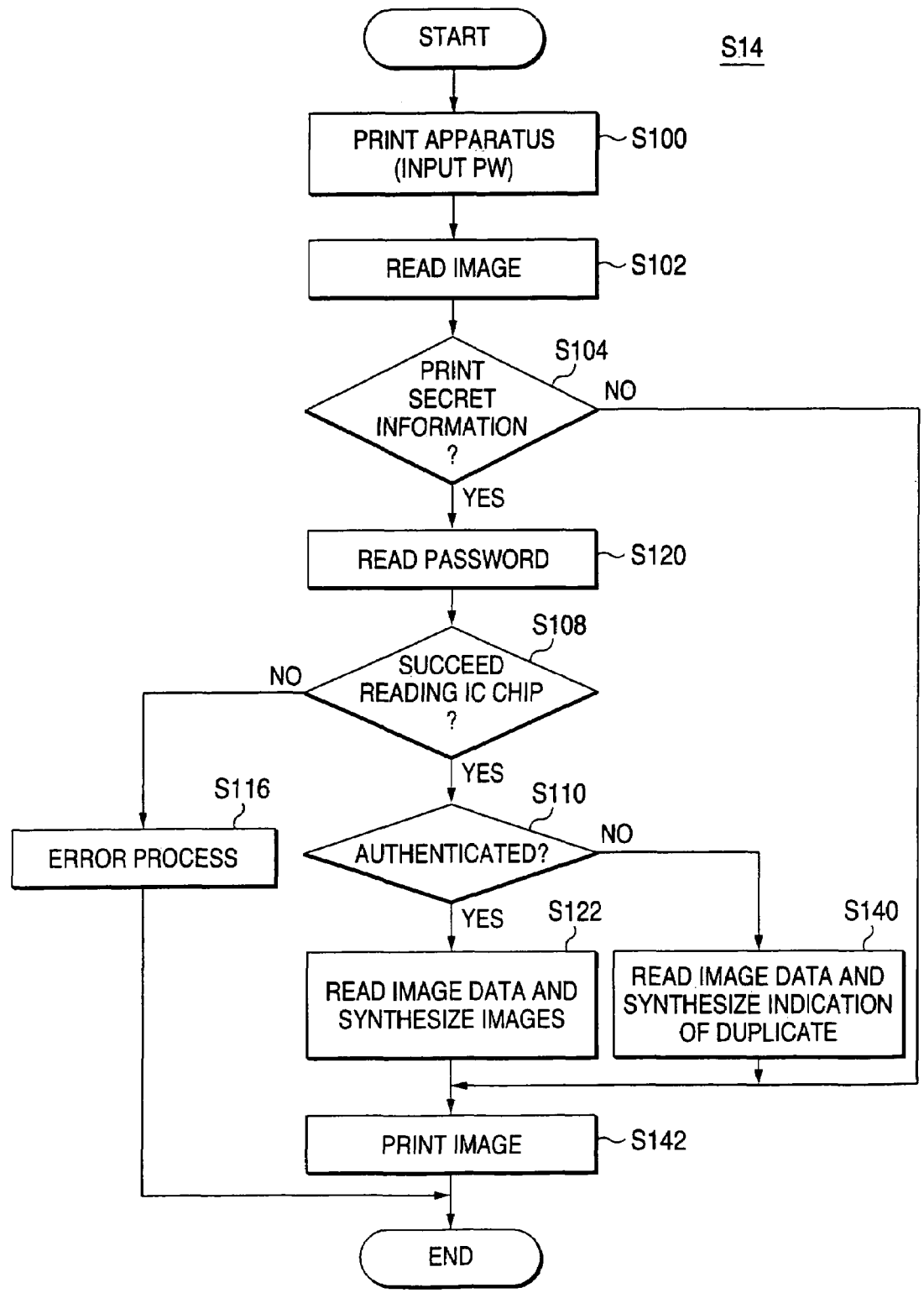
FIG. 12 is a flow chart for describing a third operation (S14) of a copying apparatus (first authenticating/printing program).

It should also be understood that the same reference numerals shown in the process operations of the first operation shown in FIG. 8 will be employed as those for the same, or similar process operations in the second operation indicated in FIG. 12.

In the second operation of the copying apparatus 1, after it is so judged in the process of the step S104 that the printing operation of the secret information is carried out, only the data indicative of the password (FIG. 4) is read from the IC chip 3 in a process defined in a step 120 (S120) In a process defined in a step 110 (S110)., after the authentication section 530 has authenticated an access operation to the secret information, the data reading section 520 newly reads the data indicative of the secret information from the IC chip 3 in a process defined in a step 122 (S122). Then, the image synthesizing section 532 performs the image synthesizing operation.

As previously described, the process of reading the secret information from the IC chip 3 after the authentication has been made is achieve a better result in order to improve secrecy of the information, as compared with another process operation in which both the password and the secret information are read from the IC chip 3 at the same time.

FIG. 12 is a flow chart for describing a third operation (defined in step S14) of the copying apparatus 1 (first authenticating/printing program 5).

Figure 13:
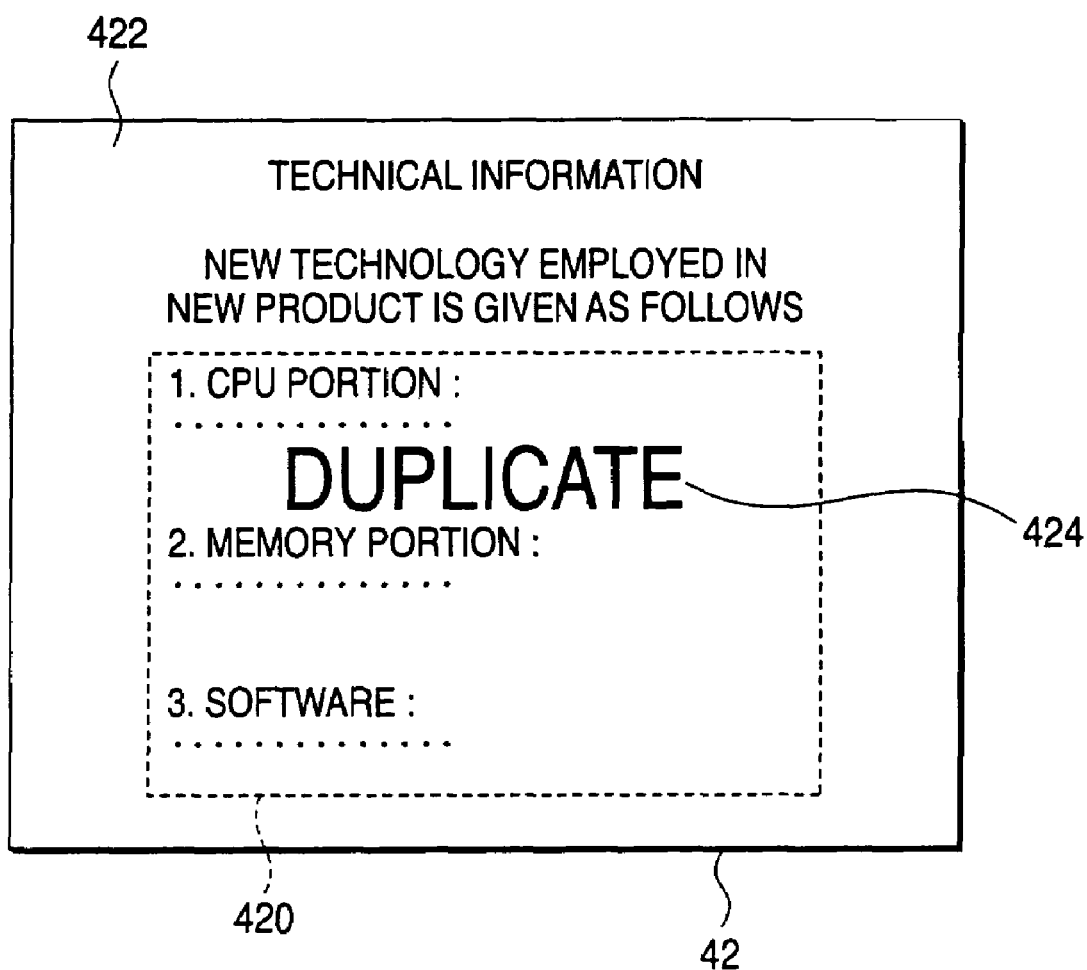
FIG. 13 is a diagram for exemplifying a duplication indication which is printed on a printing paper in the case that authentication is denied in the third operation shown in FIG. 12.

FIG. 13 is a diagram for showing a duplication indication 424, which is printed on a printing paper when authentication is denied in the third operation shown in FIG. 12.

It should also be understood that the same reference numerals shown in the process operations of the third operation shown in FIG. 12 will be employed as those for the same, or similar process operations of the first operation and the second operation indicated in FIG. 8 and FIG. 11.

As shown in FIG. 12, in the third operation of the copying apparatus 1, when the authentication section 530 denies the access operation with respect to the secret information in the process defined in the step S110, in a process defined in a step S140, the authentication section 530 further synthesizes an image data indicative of a "duplication" (namely, duplication indication 424) with both the image data read by the image reading section 500 and the data indicative of the secret information read from the IC chip 3 as shown in FIG. 13. Then, the authentication section 530 outputs the synthesized data to the printing section 540.

As previously explained, the process of adding the image data indicative of the duplication when the access operation with respect to the secret information is denied may be suitable for a case of controlling a duplication relating to the secret information having not so high secrecy.

As previously explained, in accordance with the image forming system and the image forming method of the present invention, the secret information can be protected and the copying operation can be restricted, while utilizing such a semiconductor chip from which the data stored thereinto may be read in the non-contact manner.

What is claimed is:

1. An image forming system comprising:
   an image display medium, that is a sheet of paper, on which an unencrypted first image is visibly displayed on a surface of the display medium without authentication; and
   an image forming apparatus, wherein:
   the image display medium includes a data supply apparatus, which stores therein encrypted data of a second image which is not visible on the surface of the display medium and authentication data used for an access authentication to the data of the second image and supplies the stored data of the second image and the stored authentication data to an external; and
   the image forming apparatus includes:
   an image reading section for reading the displayed first image from the surface of the display medium;
   a data reading section for reading the supplied data of the second image and the supplied authentication data from the data supply apparatus;
   an authentication section for receiving access to the data of the second image and determining whether or not to allow the access to the data of the second image, on the basis of the read authentication data; and
   an image forming section for forming the first visible, unencrypted image and the second not visible, encrypted image when the access to the data of the second image is authenticated, and does not form the second not visible, encrypted image when authentication fails.

2. The image forming system according to claim 1, wherein:
   the data supply apparatus has an encrypting section for encrypting the data of the second image and the authentication data, which are supplied to the external; and
   the image forming apparatus further includes:
   a decrypting section for decrypting the read authentication data.

3. The image forming system according to claim 1, wherein:
   the data of the second image and the authentication data, which are supplied to the external, have been encrypted; and
   the image forming apparatus further includes:
   a decrypting section for decrypting the read authentication data.

4. The image forming system according to claim 1, wherein the data reading section reads the data of the second image when the access to the data of the second image is authenticated.

5. The image forming system according to claim 1, wherein:
   when the access to the data of the second image is not authenticated, the image forming section forms the first image and an image indicating that the access to the data of the second image is not authenticated.

6. The image forming system according to claim 1, wherein:
   the image display medium is an original on which the first image is formed;
   the data supply apparatus is attached to the original;
   the data supply apparatus is a non-contact memory, wherein the data of the second image and the authentication data, which are stored in the non-contact memory, are readable from the external in a non-contact manner; and
   the data reading section of the image forming apparatus reads the supplied data of the second image and the supplied authentication data from the non-contact memory in the non -contact manner.

7. The image forming system according to claim 1, wherein: the authentication data is a password;
   the data reading section reads the supplied data of the second image and the supplied password; and
   when an input password for the access to the data of the second image is coincident with the read password, the authentication section allows to access the data of the second image.

8. The image forming system according to claim 1, wherein:
   the data of the second image indicates an image, which should be formed in combination with the data of the first image; and
   when the image forming section forms the second image, the image forming section forms the second image in combination with the first image.

9. An image forming method comprising:
   supplying encrypted data of a second image which is not visible and authentication data from an image display medium;
   reading an unencrypted visible first image from a surface of the image display medium;
   reading the encrypted data of the second image which is not visible and the supplied authentication data from a data storage apparatus in the image display medium;
   receiving access data of the second image which is not visible;
   determining whether or not the second image which is not visible is authenticated based on the read authentication data and the received access data; and
   forming the first image and the second image when the access to the data of the second image is authenticated, and forming only the first image in all other cases.

10. A computer-readable medium containing a program that causes a computer to perform a process comprising:
    reading an unencrypted visible first image from a surface of an image display medium;
    reading encrypted data of a second image which is not visible and authentication data from a data storage apparatus in an image display medium;
    receiving access data of the second image which is not visible;
    determining whether or not the second image which is not visible is authenticated based on the read authentication data and the received access data; and
    forming the first image and the second image when the access to the data of the second image is authenticated, and forming only the first image in all other cases.

* * * * *